Nov. 4, 1930.                K. HONDA                1,780,822
MACHINE FOR TESTING AND QUANTITATIVELY INDICATING THE
CUTTING POWER AND DURABILITY OF BLADES AND CUTLERY
Filed Sept. 18, 1926
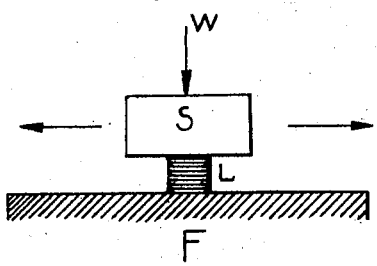
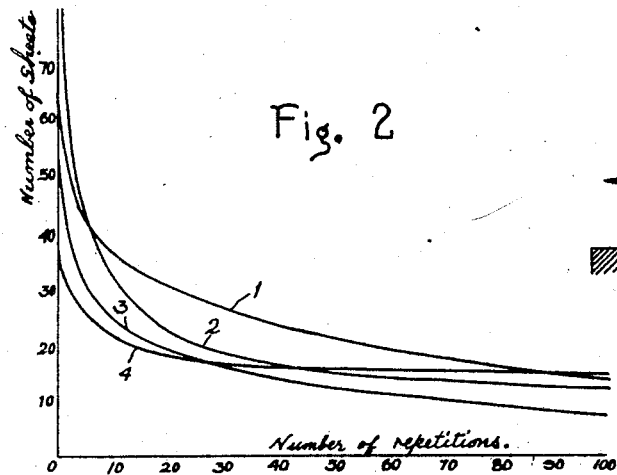
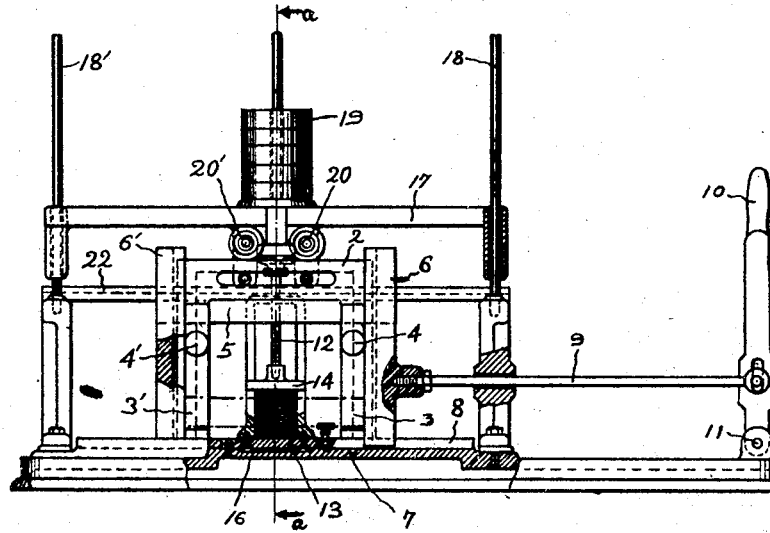
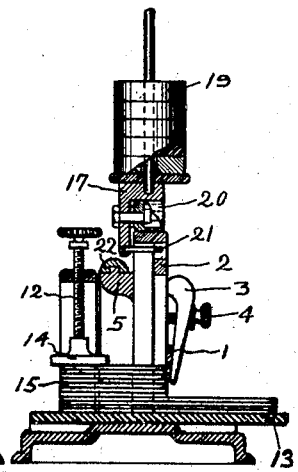
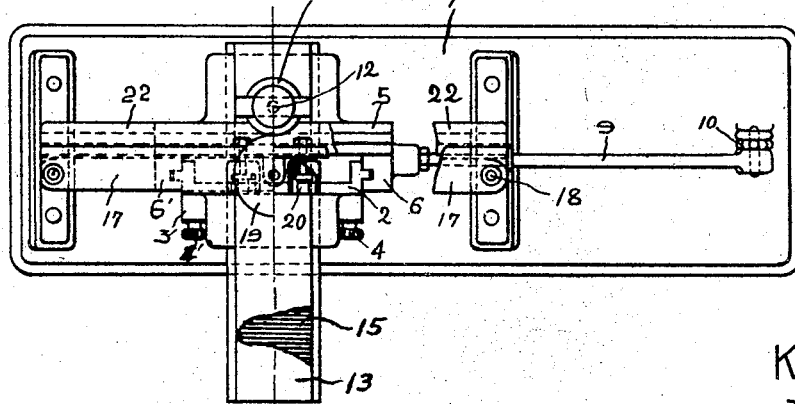
Inventor
Kotaro Honda
by B. E. Stendal
His Attorney Patented Nov. 4, 1930

1,780,822

UNITED STATES PATENT OFFICE

KOTARO HONDA, OF SENDAI, JAPAN

MACHINE FOR TESTING AND QUANTITATIVELY INDICATING THE CUTTING POWER AND DURABILITY OF BLADES AND CUTLERY

Application filed September 18, 1926, Serial No. 136,370, and in Japan January 20, 1926.

The present invention relates to a novel testing machine which will give a quantitative recording or indication of the cutting power and the durability of a blade.

The sharpness of a blade or cutting power of a cutlery such as a sword has hitherto been left to one's own objective judgment, and no exact quantitative determination was given to it. I have arranged a machine which enables us to measure this cutting power in a scientific and quantitative manner, by supporting a blade to be tested horizontally in the right position against a pile of paper, clothes or other thin sheet lamination and a definite weight is applied to the blade which is arranged in such a way as can be m ved through a definite range, and the number of sheets thus cut by this operation gives the measure of the initial cutting power. The number of sheets cut by a blade after 10, 20 and 30 repetitions of such operations gives the cutting power which obtains after using the blade 10, 20 and 30 times. I took number of repetitions which is necessary to reduce the number of sheets cut thereby to one half or to one fifth of its initial one as the measure of the durability of the blade.

For a better understanding of my invention, reference is taken to the following description and the accompanying drawings. Fig. 1 is the diagrammatic representation of the mechanism which explains the principle of my invention. Fig. 2 is a diagram of the curves representing the decrease of the cutting power which have been obtained by testing several kinds of blades with my testing machine and Fig. 3 is an elevation of the testing machine partly in section. Fig. 4 is its plan view, while Fig. 5 is a sectional side-view taken on the line $a$—$a$ in Fig. 3, as seen in the direction of the arrow.

The novel features and combinations which I believe to be characteristic of my invention are especially set forth in the appended claims.

Referring now to Figs. 1 and 2 which explain the principle of my invention, S is a blade to be tested and put on a lamination L of thin sheets of paper placed on the base or the floor F and is loaded with a definite load W. I myself actually counted the number of sheets of paper cut by the blade under the above-mentioned condition by one to-and-fro operation (the distance covered 3 cms.) of the blade and took the number as the measure of its cutting power.

I have made a number of experiments with several blades, such as for example, with (1) a Japanese sword (named Masamune),
(2) a foreign razor (Henkel),
(3) a Japanese sword (named Muramasa),
(4) a kitchen knife (made in Sakai, Japan), and measured the cutting power and its variation with the number of repetitions, expressing their relations by the curves 1, 2, 3 and 4 which illustrate the decaying of the cutting power of the blade.

If we take the number of repetitions of the to-and-fro operation which is necessary to reduce the number of sheets cut by each operation to one-fifth of that which is obtained in the case of the first operation, then the durability of the above-mentioned tools, according to this definition, is as follows:

(1) a Japanese sword (Masamune) _____ 110
(2) a foreign razor (Henkel) _____ 25
(3) a Japanese sword (Muramasa) _____ 53
(4) a kitchen knife (Sakai) _more than_ 100

I have shown in Figs. 3 to 5 a testing machine constructed in accordance with the principle of my invention. 1 represents a blade to be tested, 2 is a supporting frame, 3 is a blade supporting member, the blade 1 being clamped between the frame 2 and the member 3 by a screw 4. Two legs of the supporting frame 2 are guided by the vertical frames 6 and 6' so that they can be moved freely along them. The frames 6 and 6' are bound together by the side arm 5 and cooperate with a horizontal beam 22 at their upper part and their lower parts are guided by the groove 8 which is dug on the base 7. This movable frame 6 is connected with a rod 9 which is in turn connected with a hand lever 10 hinged to the base 7 at 11. By means of this lever the frame is moved horizontally fore and aft through a definite range.

12 represents a paper clamping device provided with a base plate 13 and a compressing plate 14, between which thin sheet laminations of paper 15 are pressed and clamped. The base plate 13 together with the groove 16 on the base 7 serves to feed the lamination of paper under the blade either by hand operation or by a suitable automatic means (not shown).

17 is a cross beam supported at both ends and can slide in the vertical direction by two stanchions 18 and 18' fixed to the base 7 and a suitable weight 19 is placed on it. The cross beam comprises a set of rollers 20 and 20' at its bottom so as to rest on the frame 2 as a whole and to exert a definite pressure on the blade as the frame 2 is moved horizontally. 21 is a projecting plug to lift the frame 2.

It will be apparent that by the testing machine of my own invention, constructed and arranged as described above, the cutting power can easily be determined quantitatively by simply operating it with the handle 10 using a suitable weight 19, and also the durability of the blade can be determined by repeating the above operation. It provides an effective means of testing the characteristics of blades or other cutters in a definite quantitative manner with a simple instrument that can be easily operated.

In accordance with the provisions of the patent statutes, I have described the principle of the operation of my invention, together with the apparatus which I now consider to represent the best embodiment thereof, but I desire to have it understood that the apparatus shown is only illustrative and that the invention may also be put into practice in a different manner.

What I claim as new and desire to secure by Letters Patent of the United States, is:

1. The method for the quantitative indication of the sharpness and durability of a cutting blade, consisting in stacking a number of thin laminated testing sheets of fibrous material, moving the blade to be tested a definite distance with a constant weight applied thereto and with its cutting edge contacting the uppermost sheet to effect a cutting action of the laminated sheets so as to determine from the number of cut sheets an indication of the sharpness of the said blade, and determining from the number of cutting repetitions necessary to reduce the cutting action to a definite fraction the durability of the blade.

2. Means for quantitatively determining the cutting power and durability of a blade or cutlery, comprising means for supporting a blade at a definite position, a device for putting a constant weight or force on said blade, a mechanism for moving horizontally said blade on which is applied with a definite weight or force through a certain range of distance and a clamping device for supporting thin sheet laminations of paper, cloth or other fibrous material at a certain relative position against said blade.

3. A testing machine for quantitatively determining the cutting power and durability of a blade or cutlery comprising a base, a supporting frame movable in a definite direction relatively to said base, a blade supporting member which can slide up and down guided by the former supporting frame, a device for putting a necessary weight on said blade-supporting member, a receptacle for sheet laminations loosely fitted with respect to said base, a clamping mechanism for said lamination, and an operating member for giving a definite motion to said supporting frame and a blade supporting member.

4. A testing machine for the quantitative determination of the cutting power and the durability of a blade or cutlery comprising a base, a plurality of vertical rods attached to said base, a cross beam guided by said rods, a weight put on said cross beam, a number of guide rollers mounted on said blade-supporting member, a supporting frame movable in the prescribed directions relatively to said base, said blade-supporting member being guided by said frame and loaded with a constant weight throughout its stroke by means of rollers, means for clamping and feeding the sheet lamination toward the blade, and an operating member for giving a definite motion to said supporting frame and the blade supporting member.

In witness whereof, I have hereunto set my hand this 29th day of January, 1927.

KOTARO HONDA.